US012756082B2

(12) United States Patent
Nishiura et al.

(10) Patent No.: US 12,756,082 B2
(45) Date of Patent: Oct. 6, 2026

(54) NOTCH FILTER

(71) Applicant: Inter-University Research Institute Corporation, National Institutes of Natural Sciences, Tokyo (JP)

(72) Inventors: Masaki Nishiura, Toki (JP); Takashi Shimizu, Toki (JP); Sakuji Kobayashi, Toki (JP); Shin Kubo, Toki (JP)

(73) Assignee: Inter-University Research Institute Corporation, National Institutes of Natural Sciences, Tokyo (JP)

( * ) Notice: Subject to any disclaimer, the term of this patent is extended or adjusted under 35 U.S.C. 154(b) by 405 days.

(21) Appl. No.: 18/305,090

(22) Filed: Apr. 21, 2023

(65) Prior Publication Data

US 2023/0268628 A1 Aug. 24, 2023

Related U.S. Application Data

(63) Continuation of application No. PCT/JP2021/044012, filed on Dec. 1, 2021.

(30) Foreign Application Priority Data

Dec. 2, 2020 (JP) ................................ 2020-200186

(51) Int. Cl.
*H01P 1/207* (2006.01)

(52) U.S. Cl.
CPC .................................... *H01P 1/207* (2013.01)

(58) Field of Classification Search
CPC ........... H01P 1/207; H01P 1/212; H01P 1/209
See application file for complete search history.

(56) References Cited

U.S. PATENT DOCUMENTS 3,516,032 A * 6/1970 Hans ........................ H01P 1/162 333/21 R
4,862,122 A * 8/1989 Blair, Jr. .................... H01P 1/20 333/219.1

(Continued)

FOREIGN PATENT DOCUMENTS

DE 37 29 402 3/1989
JP 50-074954 6/1975

(Continued)

OTHER PUBLICATIONS

International Search Report dated Feb. 22, 2022 from International Application No. PCT/JP2021/044012.

*Primary Examiner* — Andrea Lindgren Baltzell
*Assistant Examiner* — Kimberly E Glenn
(74) *Attorney, Agent, or Firm* — Beyer Law Group LLP

(57) ABSTRACT

The present disclosure aims to improve the performance of a notch filter using a rectangular waveguide and a cavity. A notch filter has a rectangular opening that is formed in an end face thereof. Inside of the notch filter, a waveguide is connected with circular cavities and by connecting pipes. In a planar shape of the waveguide, from an inlet side thereof, a wide path portion, a tapered portion and a narrow path portion are formed and are further connected with a tapered portion and a wide path portion. The circular cavities and designed according to the frequency of the electromagnetic wave that is to be trapped are provided in the middle of the narrow path portion. The configuration of decreasing the width of the waveguide in a location where the circular cavities are provided improves the performance of removal of the electromagnetic wave by the circular cavities.

9 Claims, 19 Drawing Sheets

(56) References Cited

U.S. PATENT DOCUMENTS

| | | | | | |
|---|---|---|---|---|---|
| 5,065,119 | A | * | 11/1991 | Jachowski | H01P 1/209 333/219.1 |
| 5,191,304 | A | * | 3/1993 | Jachowski | H01P 1/2084 333/202 |
| 5,256,990 | A | | 10/1993 | Young | |
| 6,118,978 | A | * | 9/2000 | Ihmels | H01P 1/211 455/12.1 |
| 7,323,954 | B2 | * | 1/2008 | Lee | H01P 1/2088 333/219.1 |
| 7,956,708 | B2 | * | 6/2011 | Bates | H01P 1/208 333/230 |
| 8,970,321 | B2 | | 3/2015 | Kawamura et al. | |
| 2009/0237184 | A1 | | 9/2009 | Sarasa | |
| 2013/0051724 | A1 | | 2/2013 | Baik et al. | |

FOREIGN PATENT DOCUMENTS

| | | |
|---|---|---|
| JP | 2005-175612 | 6/2005 |
| JP | 2009-539291 | 11/2009 |
| JP | 2014-17695 | 1/2014 |
| JP | 2015-56721 | 3/2015 |
| JP | 2016-082434 | 5/2016 |

* cited by examiner

NOTCH FILTER

CLAIM OF PRIORITY

This application is a Continuation of International Patent Application No. PCT/JP2021/044012, filed on Dec. 1, 2021, which claims priority to Japanese Patent Application No. 2020-200186, filed on Dec. 2, 2020, each of which is hereby incorporated by reference.

BACKGROUND OF THE INVENTION

1. Field of the Invention

The present invention relates to a notch filter using a waveguide and a cavity.

2. Description of the Related Art

A notch filter provided with a cavity in a waveguide has been known as a filter used to remove an electromagnetic wave of a specific frequency. The waveguide is configured to allow only an electromagnetic wave of a specified frequency to pass therethrough, according to the shape of an opening formed therein. A cavity corresponding to a frequency of the electromagnetic wave that is to be removed is mounted to such a waveguide. This cavity serves to trap the electromagnetic wave and causes the electromagnetic wave not to pass through the waveguide, so as to remove the electromagnetic wave.

With regard to the configuration of the waveguide, a variety of shapes have been proposed to cause the electromagnetic wave of the specified frequency to pass through the waveguide with high accuracy. For example, with regard to a waveguide of transmitting an electromagnetic wave in millimeter wave band in a TE10 mode, Japanese Patent Application Publication No. JP 2014-17695A discloses a configuration that a bore of the waveguide is partly narrowed such that a cutoff frequency corresponds to an upper limit in a low frequency range thereof. Japanese Patent Application Publication No. JP 2015-56721A discloses a configuration that two waveguides having different specified frequencies are connected with each other in a crank-like shape.

SUMMARY OF THE INVENTION

The waveguide generally allows the electromagnetic wave of high frequency to readily pass therethrough, while efficiently cutting the electromagnetic wave of the lower frequency than a specified frequency that is determined according to the shape of the opening. Accordingly, there is a problem that even the waveguide provided with the cavity fails to efficiently remove the electromagnetic wave of a target frequency, due to such high-frequency electromagnetic wave as the noise.

By taking into account such a problem described above, an object of the present disclosure is to provide a technique of improving the performance of a notch filter provided with a cavity in a waveguide.

According to one aspect of the present invention, there is provided a notch filter configured to remove an electromagnetic wave of a specific frequency, the notch filter comprises a rectangular waveguide provided to have a rectangular sectional shape (rectangular cross-section) and configured to cause a specified frequency band to pass therethrough; and one or more cavities formed in dimensions according to the specific frequency and mounted to be protruded in a direction perpendicular to an E plane, which is configured by long sides of the rectangular shape, at some location in an axial direction of the rectangular waveguide, wherein a length of the long sides and a length of short sides of the rectangular shape at an opening of the rectangular waveguide are dimensions that are determined according to the frequency band, and the rectangular waveguide includes a narrow path portion provided at a location where the cavity is mounted to and configured to have a narrower length of the short sides of the rectangular shape than the length of the shorter sides at the opening.

The rectangular waveguide generally used to allow a specified frequency band to pass therethrough is formed in a tubular shape having E planes configured by the long sides and H planes configured by the short sides and causes electromagnetic waves of the specified frequency band and of higher frequencies to pass therethrough. The electromagnetic wave of the specified frequency band is relatively stably transmitted through inside of the rectangular waveguide in a state of, for example, a TE10 mode, while the electromagnetic wave of a higher frequency band than the specified frequency band may not pass therethrough in such a stable state.

In the above aspect of the present disclosure, on the other hand, the narrow path portion is provided at the location where the cavity is mounted to. This configuration stabilizes transmission of the electromagnetic wave of a specific frequency that is to be removed (hereinafter may also be referred to as notch frequency) in the narrow path portion and thereby allows the electromagnetic wave of the specific frequency to be efficiently removed by the cavity. With a view to stabilizing the electromagnetic wave, it is especially effective to decrease not the dimension of the long sides of the narrow path portion but the dimension of the short sides of the narrow path portion, i.e., to narrow the interval between the E planes where the cavity is provided.

The specified frequency according to the aspect of the present disclosure may be determined by a band frequency used in the field of waveguides, for example, a Q band or a U band but is not limited to these examples.

The specific frequency may be set arbitrarily within a frequency range that is allowed to pass through inside of the rectangular waveguide and is a frequency in a higher range than a lower limit value of the specified frequency band. It is especially preferable that the specific frequency is a frequency higher than an upper limit value of the specified frequency band.

The cavity serves to remove the electromagnetic wave of the specific frequency by resonance inside thereof. The cavity may thus be formed in any of various shapes that are designed based on this principle, for example, a hollow rectangular parallelepiped shape.

In the notch filter of the above aspect, the length of the short sides of the rectangular shape in the narrow path portion may be set such as to cause the electromagnetic wave of the specific frequency to be transmitted in a predetermined mode.

This configuration further stabilizes the electromagnetic wave of the specific frequency in the narrow path portion and further improves the efficiency of removal of the specific frequency by the cavity. The predetermined mode is, for example, a TE10 mode but is not limited to this example.

In the configuration of this aspect, however, the length of the short sides of the rectangular shape in the narrow path portion may be determined arbitrarily, irrespective of the predetermined mode. This is because the effect of stabilizing the electromagnetic wave of the specific frequency is obtainable by decreasing the width of the narrow path portion to be smaller than the width of the opening. The configuration of setting the width by taking into account the predetermined mode is merely means to further improve this effect.

In the notch filter of the above aspect, the narrow path portion may have a smaller length of the long sides of the rectangular shape than the length of the long sides at the opening.

As the result of a simulation, it has been found that the configuration of decreasing the length of the long sides of the rectangular shape, i.e., decreasing the interval between the H planes, in addition to the configuration of decreasing the interval between the E planes, additionally has the effect of attenuating the electromagnetic waves of not higher than a predetermined frequency, i.e., the effect of a high-pass filter.

In the notch filter of the above aspect, the cavity may be in a cylindrical shape. The cavity is originally allowed to have any arbitrary shape. The sufficient processing accuracy is, however, required to remove the specific frequency efficiently. From this point of view, the cylindrical shape has an advantage of the easiness of high-precision processing, compared with other shapes. Another advantage is the easiness of analytical determination of the dimensions suitable to remove the specific frequency.

In the case of the cavity formed in the cylindrical shape, there may be a variety of possible arrangements for the cavity. The axial direction of the cavity may be arranged parallel to the short sides of the rectangular waveguide or the H planes or may be arranged parallel to the long sides of the rectangular waveguide or the E planes.

The notch filter provided with the cavity in the cylindrical shape may comprise a plurality of cavities formed in the cylindrical shapes of different heights and arranged such that respective axes of the cylindrical shapes are parallel to the long sides of the rectangular shape.

As the result of a simulation, in the case of the cavity in the cylindrical shape, it has been found that the height or the length of the long side of the cylindrical shape, i.e., the cavity length, affects the frequency of the electromagnetic wave that is to be removed. Accordingly, the configuration of providing a plurality of cavities having different cavity lengths enables the electromagnetic waves of a plurality of frequencies to be removed.

One cavity serves to remove the electromagnetic wave of a certain width of frequencies about a frequency corresponding to the cavity. Accordingly, determining the cavity lengths of the plurality of cavities such as to overlap the frequencies that are to be removed by the respective cavities enables the electromagnetic waves of a wide range of frequencies about a specific frequency to be removed as a whole. Determining the cavity lengths of the plurality of cavities such as not to overlap the frequencies that are to be removed by the respective cavities, on the other hand, enables the electromagnetic waves of a plurality of discrete frequencies to be removed as a whole. Like these examples, various settings may be applied for the cavity lengths according to the purposes.

In the notch filter of the above aspect, one or more cavities may be provided in each of opposed E planes of the rectangular waveguide. As the result of a simulation, it has been found that the configuration of providing the cavities on the respective sides improves the efficiency of removal of the electromagnetic wave.

In the case where the cavities are provided in the opposed E planes of the rectangular waveguide, it is preferable to provide the respective cavities that are mounted at different positions in the axial direction of the rectangular waveguide. In other words, when the short side and the long side of the rectangular waveguide are respectively defined as an x axis and a y axis and the axial direction is defined as a z axis, it is preferable that the cavities have different z coordinate values.

The positions of the cavities may, however, be set arbitrarily. In the configuration of providing a plurality of cavities, the plurality of cavities may be located only on one side of the rectangular waveguide.

In the notch filter of the above aspect, the narrow path portion may be connected with a wide path portion that has dimensions identical with the dimensions of the opening by a tapered connection.

This configuration has such an advantage that the wide path portion and the narrow path portion are smoothly connectable with each other and are processible relatively readily.

Various methods may be employed to provide the tapered connection. For example, only one or both of two connecting portions between a wide path portion on an inlet side of the rectangular waveguide and the narrow path portion and between a wide path portion on an outlet side and the narrow path portion may be tapered. The length of the tapered connecting portion may be set arbitrarily.

In the notch filter of the above aspect, the narrow path portion may be connected with a wide path portion that has dimensions identical with the dimensions of the opening by a step. As the result of a simulation, it has been found that this configuration improves the reflection characteristic or more specifically relives the adverse effect caused by that the electromagnetic wave entering the rectangular waveguide does not pass through the rectangular waveguide but is reflected at some location in the rectangular waveguide. The step may be a single step or multiple steps.

The present disclosure is not required to have all the variety of features and characteristics described above but may be configured by appropriately omitting or combining part of these features and characteristics.

DETAILED DESCRIPTION OF EMBODIMENTS OF THE INVENTION

A. Configuration of Notch Filter

Figure 1A:
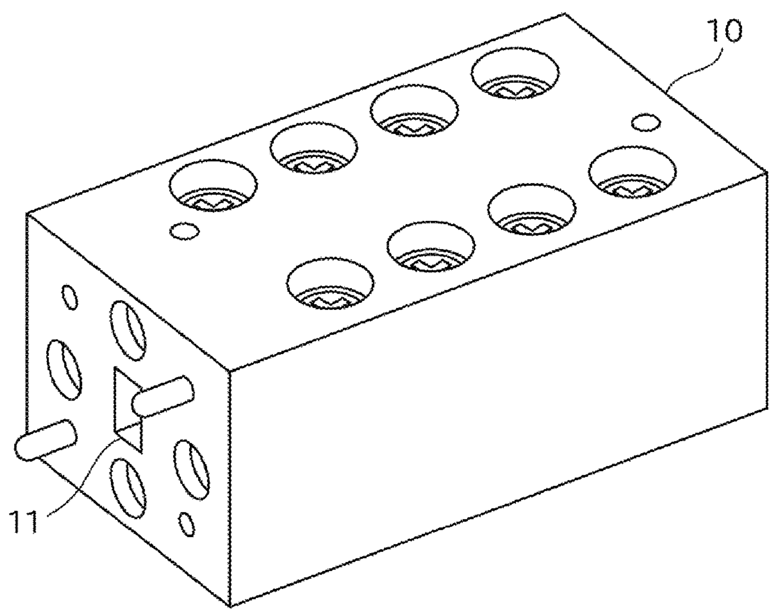
FIG. 1A is a perspective view illustrating a notch filter in accordance with one embodiment of the present invention.
Figure 1B:
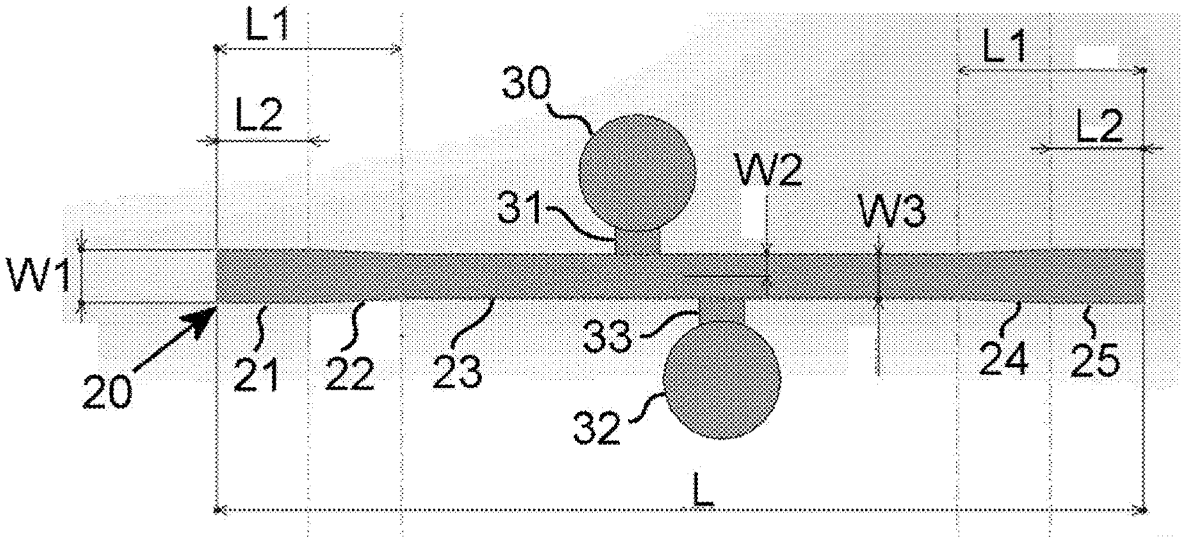
FIG. 1B is a plan view illustrating inside of the notch filter.

FIGS. 1A and 1B are explanatory diagram illustrating the configuration of a notch filter according to an embodiment. FIG. 1A is a perspective view illustrating a notch filter 10. A metal having a small resistance to high-frequency electromagnetic wave, for example, free-cutting copper, oxygen-free copper, pure aluminum or an aluminum alloy, may be selected appropriately for a main body of the notch filter 10. The notch filter 10 is in an approximately rectangular parallelepiped shape and is provided with a rectangular opening 11 formed in an end face thereof as illustrated. A similar opening is formed in an opposed end face. A hollow waveguide and cavities are formed inside of the notch filter 10. The electromagnetic wave is introduced from the opening 11, and the electromagnetic wave in a frequency band defined by the dimensions of the opening 11 passes through inside of the notch filter 10 and is transmitted to the opening on the opposite end face. In the meanwhile, the electromagnetic wave of a specific frequency corresponding to the cavity is removed. In the description below, this specific frequency to be removed may be referred to as notch frequency.

FIG. 1B is a plan view illustrating inside of the notch filter 10. Only a hollow portion formed inside thereof is illustrated. This hollow portion is configured by connecting a waveguide 20 with circular cavities 30 and 32 via connecting pipes 31 and 33 as described previously. The waveguide 20 has a rectangular sectional shape having long sides and short sides, and a width W1 of the opening corresponds to a short side (lateral direction) of the opening 11 shown in FIG. 1A. A plane of the waveguide 20 configured by long sides is called E plane, and a plane configured by short sides is called H plane.

The circular cavities 30 and 32 may be mounted at any arbitrary positions and are mounted at different positions in an axial direction of the waveguide 20 according to the embodiment. More specifically, when a short side direction of the rectangular cross section is defined as an x axis, a long side direction thereof is defined as a y axis, and an axial direction of the waveguide 20 is defined as a z axis, the circular cavities 30 and 32 have different values as the z coordinate value. This configuration enables the respective circular cavities 30 and 32 to act with the higher efficiency.

The dimension of long sides of the opening 11 and the dimension of short sides thereof (an interval between the H planes) (may simply be referred to as width) (W1) may be designed according to the frequency band of the electromagnetic wave that is made to pass through the waveguide 20. According to the embodiment, the width W1 is set to 2.845 millimeter by taking into account a TE10 mode of a Q band.

The waveguide 20 has a planar shape of a varying width as illustrated. More specifically, the waveguide 20 includes, from an inlet side thereof, a wide path portion 21 having a width identical with the width W1, a tapered portion 22 having a gradually decreasing width, a narrow path portion 23 having a width narrower than the width W1, a tapered portion 24 having a gradually increasing width, and a wide path portion 25 having a width identical with the width W1.

The waveguide 20 has an overall length L that may be designed arbitrarily but is set to 50 millimeter according to the embodiment. A length L2 of the wide path portion 21 is set to 5 millimeter, and a length L1 from an opening of the waveguide 20 to a terminal end of the tapered portion 22 or from another opening thereof to a terminal end of the tapered portion 24 is set to 10 millimeter. L1 and L2 may be designed arbitrarily. In the case where the length of the tapered portions 22 and 24 (i.e., L2−L1) is short, however, the electromagnetic wave is likely to be reflected. It is thus preferable that the length of the tapered portions 22 and 24 is such a length that allows the wide path portions 21 and 25 to be connected with the narrow path portion 23 sufficiently smoothly and is more specifically a length that is at least not shorter than a half wavelength of the electromagnetic wave.

The waveguide 20 has the varying width as described above but has a fixed height (the length of the long sides or the interval between the E planes).

The circular cavities 30 and 32 and the connecting pipes 31 and 33 may be designed according to the frequency of the electromagnetic wave that is to be trapped, for example, by a method described later. According to the embodiment, the circular cavities 30 and 32 and the connecting pipes 31 and 33 are designed to trap 56 GHz in a U band. The circular cavities 30 and 32 are provided in the middle of the narrow path portion 23 and are preferably placed near to the center of the narrow path portion 23.

The heights of the circular cavities 30 and 32 and the connecting pipes 31 and 33 may be equal to the height of the waveguide 20 or may be smaller than the height of the waveguide 20.

A width W3 of the narrow path portion 23 may be determined according to the frequency of the electromagnetic wave that is to be trapped by the circular cavities 30 and 32. According to the embodiment, since the electromagnetic wave in the U band is to be trapped as described above, the width W3 of the narrow path portion 23 is set to 2.388 millimeter on the assumption of a TE10 mode in the U band. A half width W2 is half the width W3 and is 1.194 millimeter.

The length of the narrow path portion 23 is preferably a length sufficient for improving the trapping effects by the circular cavities 30 and 32. The length is determinable by experiment or by analysis but is preferably such a length that allows at least a half wavelength of the U band that is to be trapped, to be provided before and after the circular cavities 30 and 32.

B. Method of Designing Circular Cavities

Figure 2:
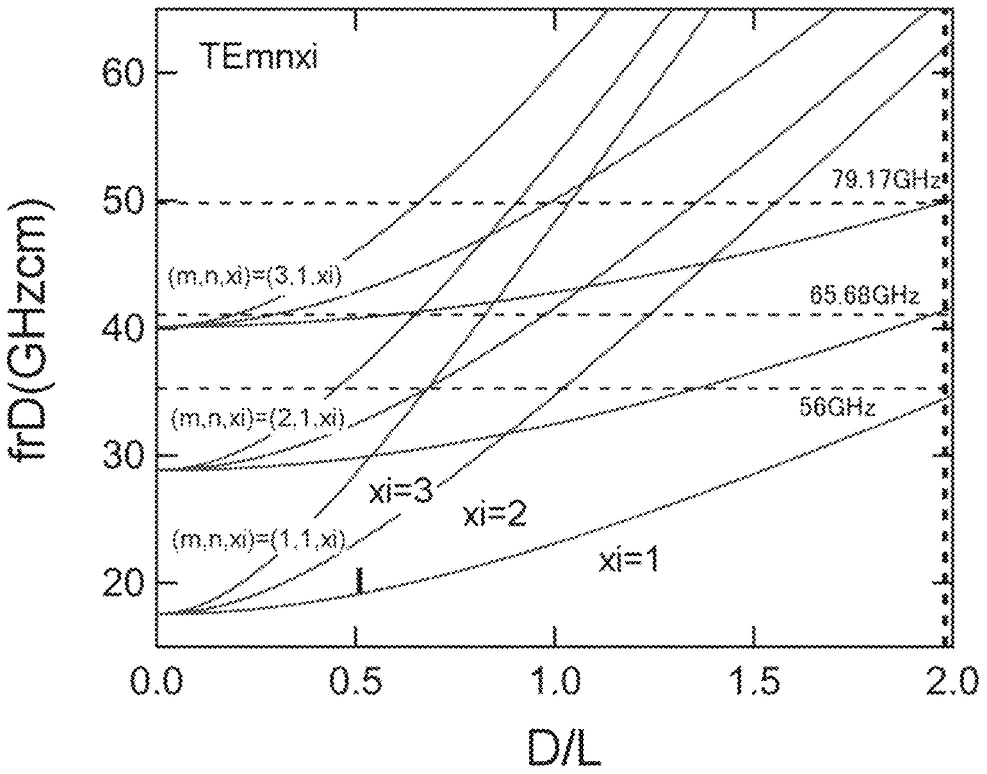
FIG. 2 is a chart showing a correlation between the dimensions of a cavity and the frequency.

The following describes a method of designing the circular cavities. FIG. 2 is a chart showing a correlation between the dimensions of a cavity and the frequency. The abscissa shows the ratio of a diameter D of a cavity to a cavity length L. The cavity length L denotes a height of a cylindrical cavity. The ordinate shows the product of the diameter of the cavity and a notch frequency fr. Respective variables used in FIG. 2 have the following meanings:

m denotes the number of full period changes of an electric field Er with regard to a circumferential direction in the cylindrical cavity;

n denotes the number of half period changes of an electric field Et with regard to a radial direction in the cylindrical cavity; and xi denotes the number of half period changes of the electric field Er with regard to an axial direction, i.e., a height direction, in the cylindrical cavity.

The configuration of setting the notch frequency fr and arbitrarily selecting m, n and xi enables the ratio of the diameter D of the cavity to the cavity length L to be determined according to these parameters with reference to the chart of FIG. 2. The diameter D of the cavity and the cavity length L are then determined by taking into account the dimensions of the rectangular waveguide and the dimensions of the overall notch filter.

C. Effects of Notch Filter

Figure 3:
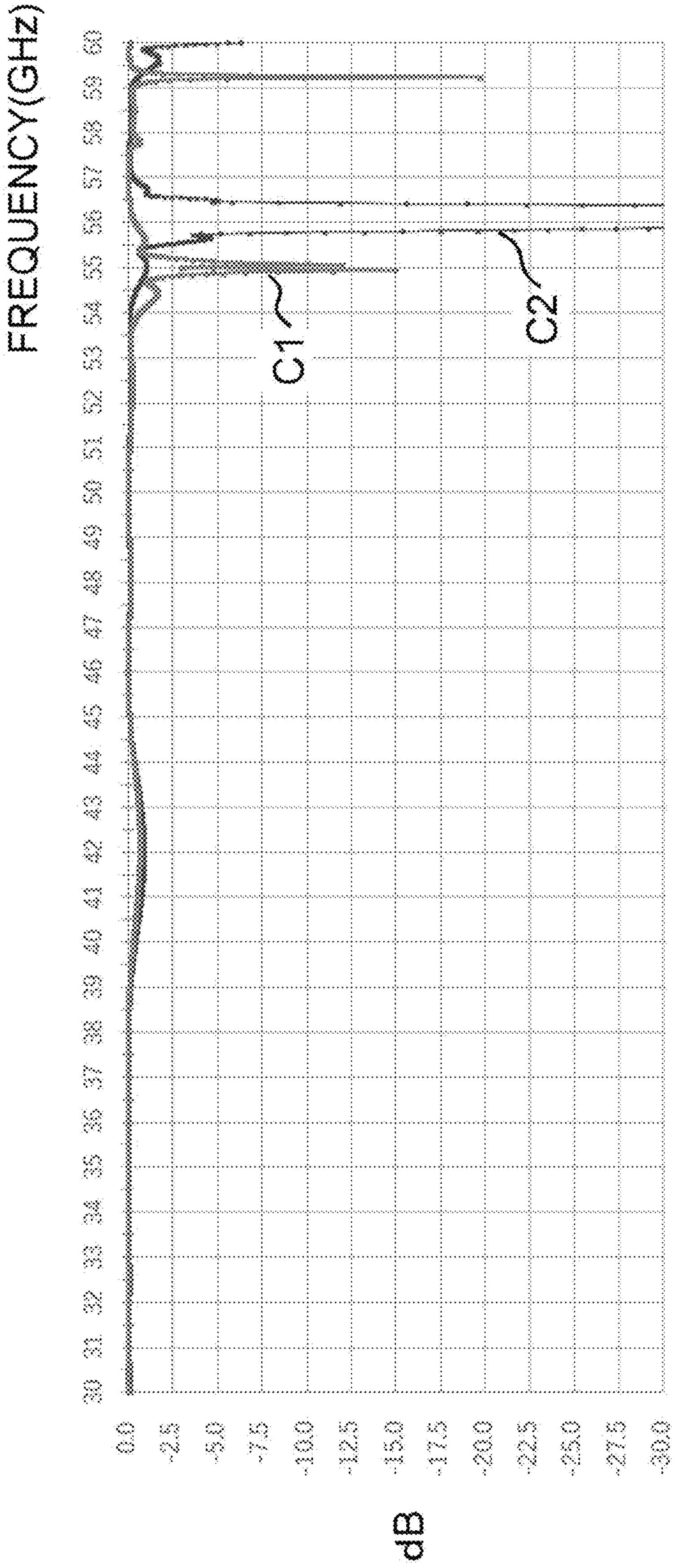
FIG. 3 is a chart showing effects of the notch filter according to one embodiment of the present invention.

FIG. 3 is an explanatory chart showing the effects of the notch filter according to the embodiment. FIG. 3 shows attenuation effects at respective frequencies in the case of using the notch filter shown in FIGS. 1A and 1B.

As described above, the notch filter includes a waveguide configured to cause the Q band to pass therethrough and circular cavities configured to remove the frequency of 56 GHz included in the U band.

A graph C1 of FIG. 3 shows the result in the case where the waveguide is not provided a narrow path portion. It is understood from this graph C1 that attenuation appears at 55 GHz and 59 GHz that are slightly deviated from a target frequency. A graph C2, on the other hand, shows the result in the case where the waveguide is provided with a narrow path portion. It is understood from this graph C2 that significant attenuation is obtained in a range including 56 GHz as the target frequency.

From these results, it is confirmed by the experiment that providing the narrow path portion in the waveguide significantly improves the performance of the notch filter.

The principle that the above results are obtained is not completely elucidated but may be attributed to the following reason. In the case of a waveguide having an opening suitable for the Q band, the opening works to remove the electromagnetic wave in a frequency band of not higher than the Q band but allows the electromagnetic wave of high frequency of not lower than the Q band (for example, the electromagnetic wave in the U band) to relatively readily pass through the waveguide. The dimensions of the waveguide are designed for the Q band, so that the electromagnetic wave in the Q band is allowed to stably pass through the waveguide in the TE10 mode, i.e., in a state that the half wavelength is included in the width of the waveguide. The electromagnetic wave in the U band or the like, on the other hand, has the shorter wavelength than that of the Q band and is thus likely to be not stable in the waveguide designed for the Q band.

It is accordingly thought that the cavities provided in the waveguide in this state have the low probability of trapping the electromagnetic wave and have insufficient performance as shown by the graph C1 in FIG. 3. The configuration of providing the narrow path portion designed for the U band in the vicinity of the mounting locations of the cavities like the notch filter of the embodiment, on the other hand, stabilizes the electromagnetic wave in the U band and thus allows the electromagnetic wave in the U band to be readily trapped by the cavities. As a result, this improves the attenuation effects as shown by the graph C2 in FIG. 3.

Figure 4:
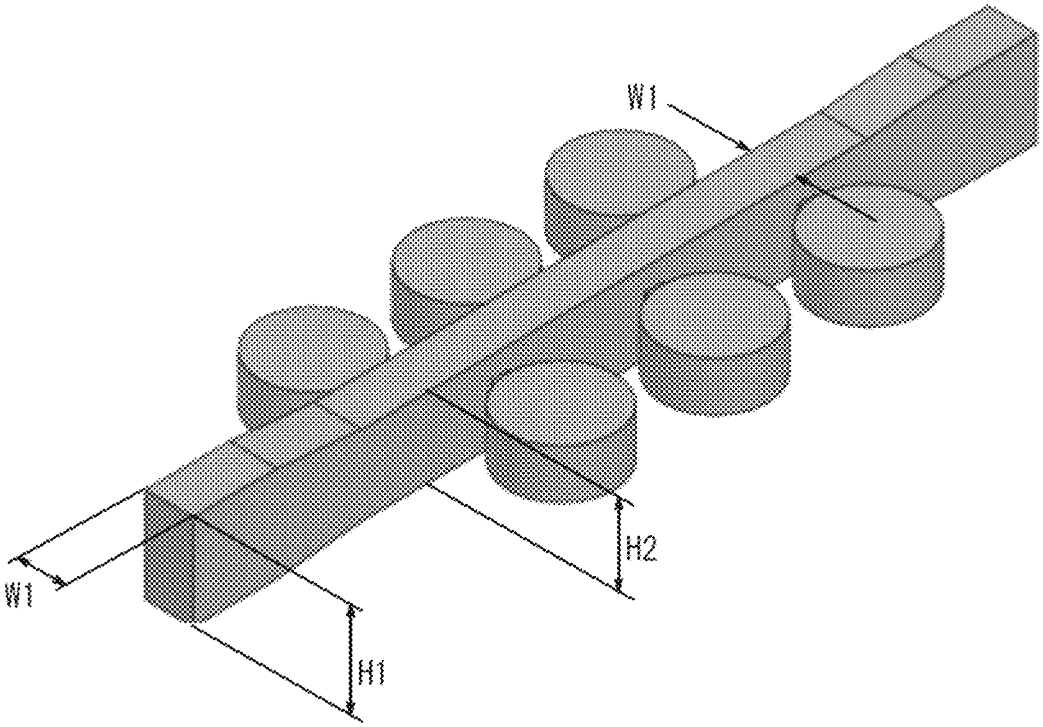
FIG. 4 is an explanatory diagram illustrating the configuration of a notch filter according to a comparative example.

FIG. 4 is an explanatory view illustrating the configuration of a notch filter according to a comparative example. The notch filter of the comparative example has a similar basic configuration to that of the notch filter 10 of the embodiment shown in FIGS. 1A and 1B. The comparative example has the following differences from the embodiment. In the notch filter 10 of the embodiment, the narrow path portion 23 having the narrower width than the width W1 of the opening is formed near the center of the waveguide 20. In the notch filter of the comparative example shown in FIG. 4, on the other hand, the width of a waveguide is constant over the full length of the waveguide and is equal to the width W1 of the opening. Additionally, in the notch filter of the comparative example, the height of the waveguide near the center thereof is a height H2 that is lower than the height H1 of the opening. Accordingly, the configuration of the comparative example is equivalent to a configuration of decreasing the length of the long side of the waveguide to form the narrow path portion, instead of decreasing the width of the waveguide as in the embodiment.

Figure 5:
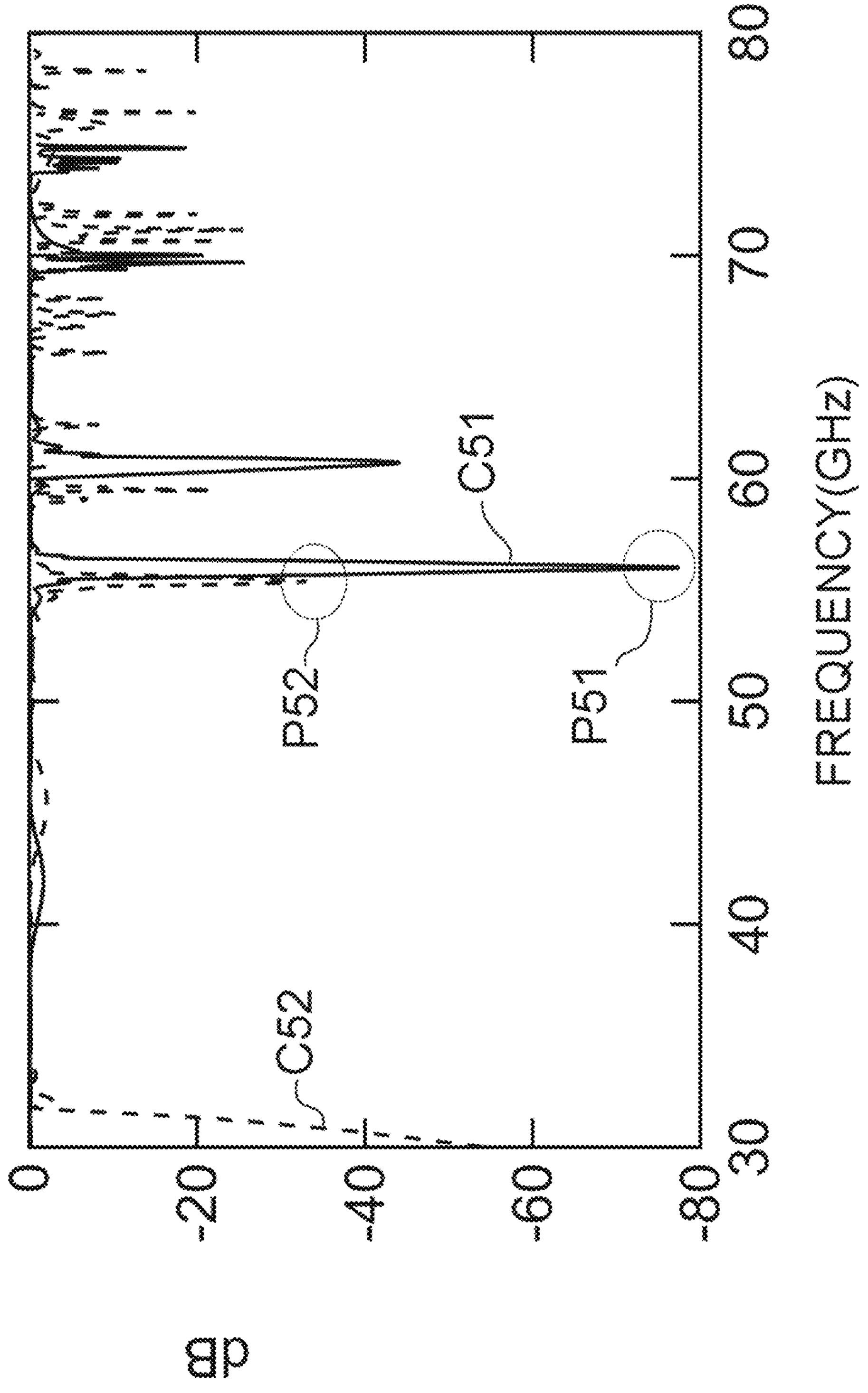
FIG. 5 is an explanatory chart showing the effects of the notch filter according to the comparative example.

FIG. 5 is an explanatory chart illustrating the effects of the notch filter according to the comparative example. This shows the results of a simulation of attenuation at respective frequencies when the electromagnetic wave in the Q band is made to pass through the waveguide. A graph C51 shown by the solid line shows the result with regard to the notch filter of the embodiment, and a graph C52 shown by the broken line shows the result with regard to the notch filter of the comparative example. At frequencies around 56 GHz as the notch frequency, the result C51 of the embodiment has an amount of attenuation of approximately 80 dB as shown by a peak P51, whereas the result C52 of the comparative example has an amount of attenuation of approximately 35 dB as shown by a peak P52. These results show that the notch filter of the comparative example has the lower effects than those of the notch filter of the embodiment.

This means that the configuration of decreasing the width, i.e., the interval between the side faces where the cavities are provided is more effective than the configuration of decreasing the length of the long side of the waveguide, in the case of providing the narrow path portion.

It is not necessary to provide all the variety of features and characteristics described above, but part of these features and characteristics may be omitted or may be combined appropriately. The present disclosure is not limited to the configuration of the above embodiment but may be implemented by a variety of modifications.

D. Modifications

D1. First Modification

Figure 6A:
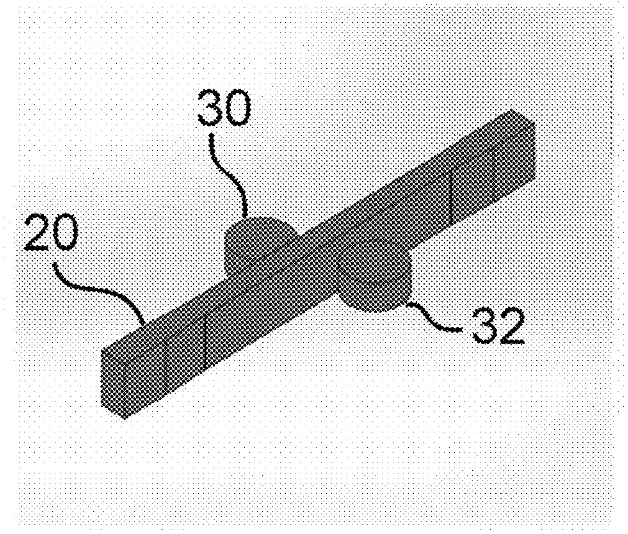
FIGS. 6A through 6C are explanatory views illustrating the configurations of notch filters according to a first modification.
Figure 6B:
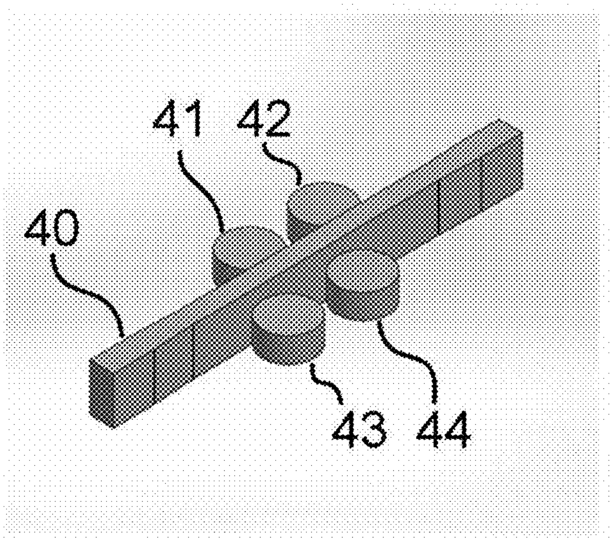
Figure 6C:
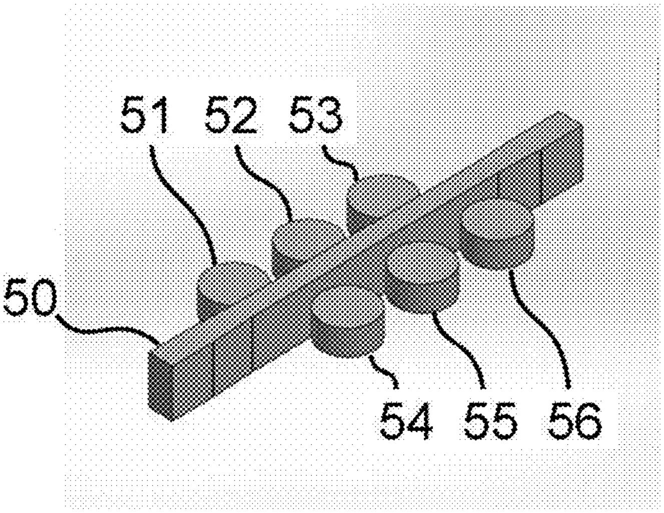

FIGS. 6A through 6C are explanatory views illustrating the configurations of notch filters according to a first modification. FIG. 6A is a perspective view illustrating the waveguide 20 and the circular cavities 30 and 32 of the notch filter 10 illustrated in FIGS. 1A and 1B. FIG. 6B is a perspective view illustrating a notch filter with four circular cavities 41 to 44 mounted to a waveguide 40. FIG. 6C is a perspective view illustrating a notch filter with six circular cavities 51 to 56 mounted to a waveguide 50.

The number of the circular cavities is not limited to two but may be any number like the above examples and may not be necessarily an even number. In the case of providing a plurality of cavities, the dimensions of the respective cavities may differ according to the frequencies of the electromagnetic waves to be trapped respectively. This configuration allows for removal of a wide variety of electromagnetic waves.

All the examples shown in FIG. 2 are on the assumption of removal of the U band. In any of the waveguides 20, 40 and 60, the narrow path portion has a fixed width. The width of the narrow path portion may, however, be varied stepwise according to the frequencies to be trapped.

D2. Second Modification

Figure 7:
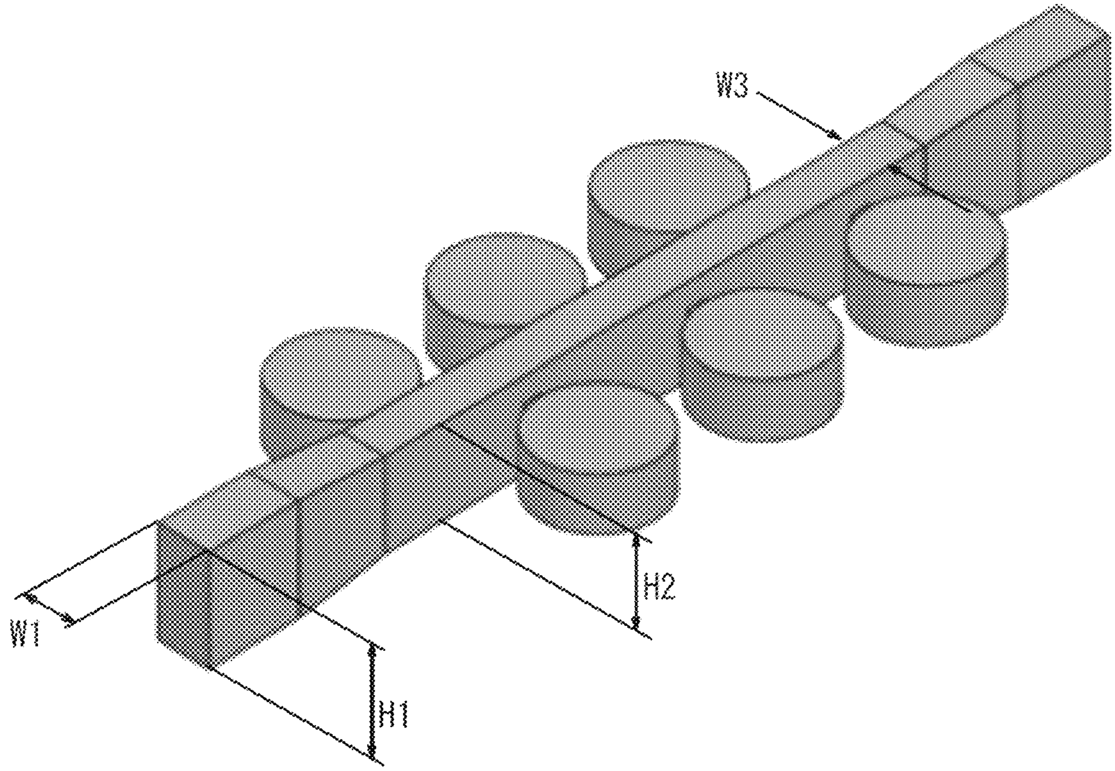
FIG. 7 is an explanatory view illustrating the configuration of a notch filter according to a second modification.

FIG. 7 is an explanatory view illustrating the configuration of a notch filter according to a second modification. The notch filter of the second modification has a similar basic configuration to that of the notch filter 10 of the embodiment shown in FIGS. 1A and 1B. The second modification has the following differences from the embodiment. In the notch filter 10 of the embodiment, the narrow path portion 23 having the narrower width than the width W1 of the opening is formed near the center of the waveguide 20. In the notch filter of the second modification shown in FIG. 7, on the other hand, a narrow path portion has a narrower width W3 than the width of the opening like the embodiment and additionally has a lower height H2 than the height H1 of the opening. Accordingly, the configuration of the comparative example is equivalent to a configuration of decreasing both the width and the length of the long side of the waveguide to form the narrow path portion.

Figure 8:
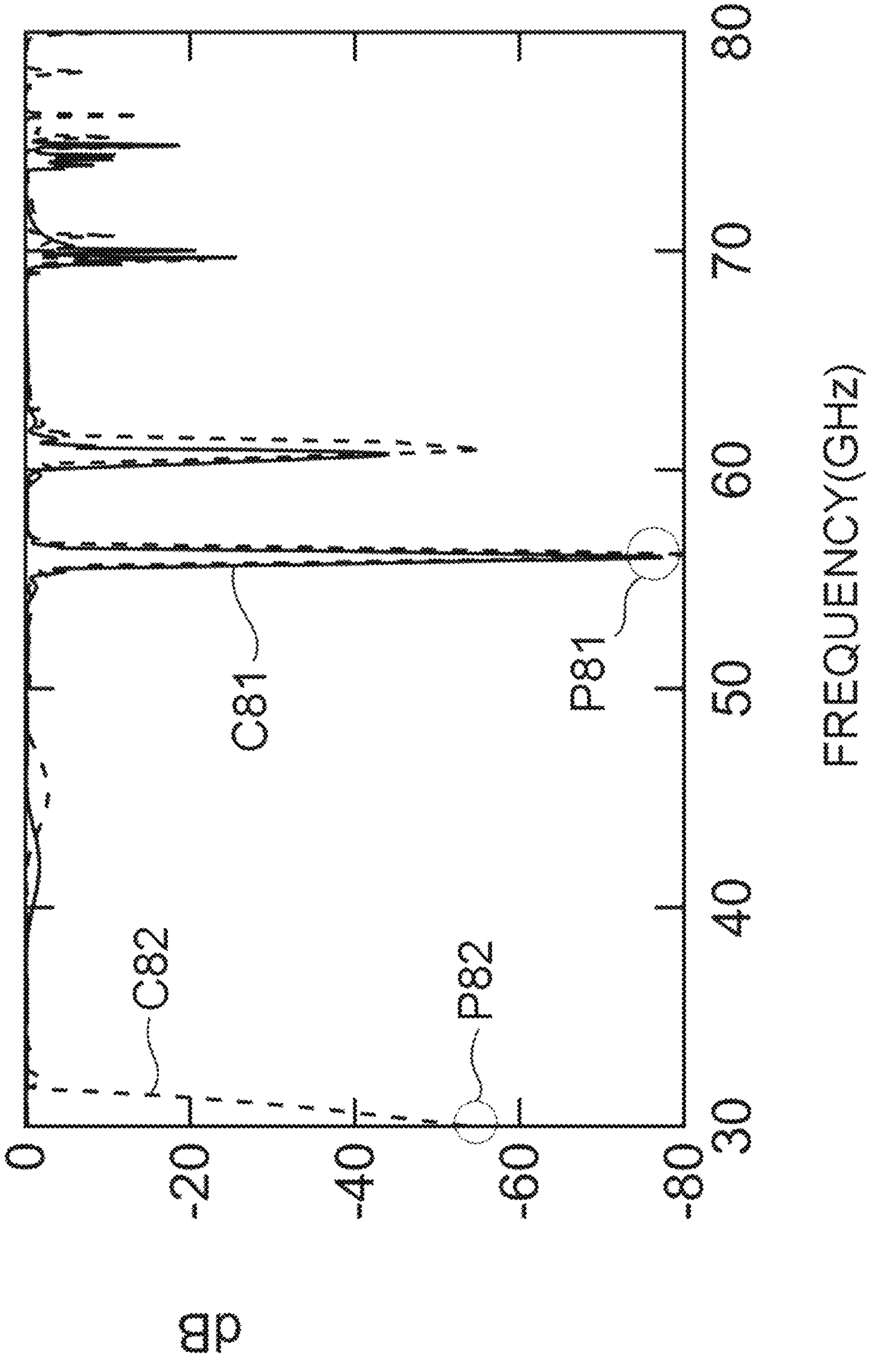
FIG. 8 is an explanatory chart showing the effects of the notch filter according to the second modification.

FIG. 8 is an explanatory view illustrating the effects of the notch filter according to the second modification. This shows the results of a simulation of attenuation at respective frequencies when the electromagnetic wave in the Q band is made to pass through the waveguide. A graph C81 shown by the solid line shows the result with regard to the notch filter of the embodiment, and a graph C82 shown by the broken line shows the result with regard to the notch filter of the second modification. At frequencies around 56 GHz as the notch frequency, the results of the embodiment and the second modification are equivalent to each other as shown by a peak P71. The result C82 of the second modification has a significant attenuation in a low frequency band of not higher than 32 GHz as shown by a peak P82. This means that the notch filter of the second modification serves as a high-pass filter.

This shows that the configuration of decreasing both the width and the length of the long side of the narrow path portion additionally provides the effects of a high-pass filter, without affecting the attenuation effect at the notch frequency.

D3. Third Modification

Figure 9A:
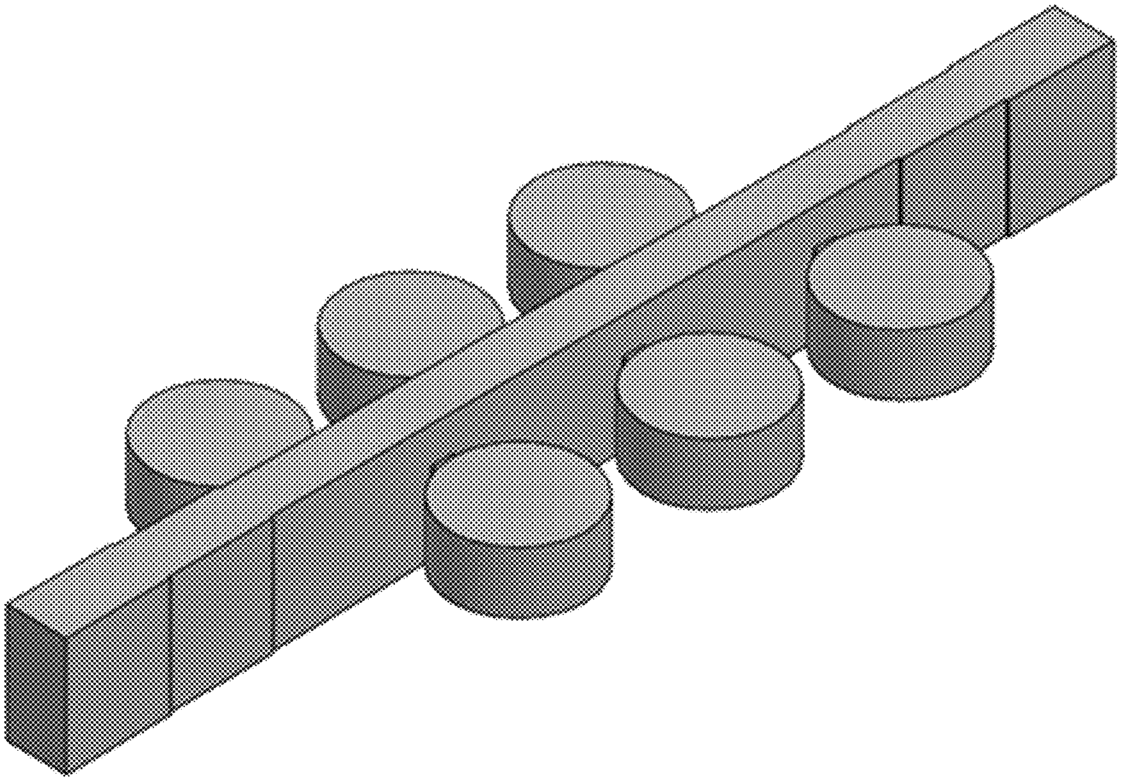
FIGS. 9A and 9B are a perspective view and a partial plan view, respectively, illustrating the configuration of a notch filter according to a third modification.
Figure 9B:
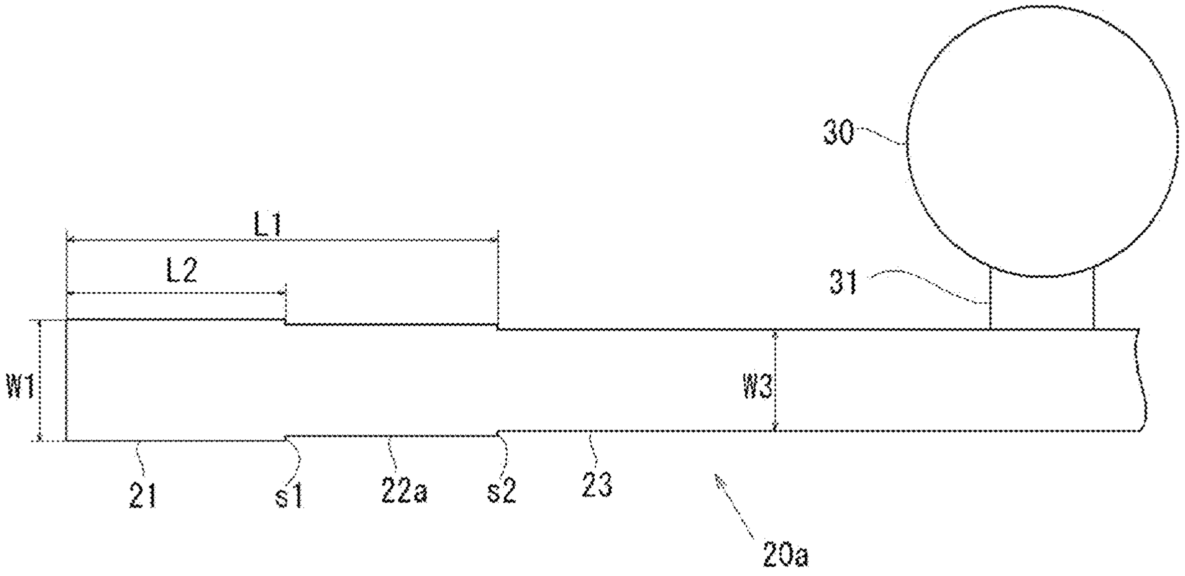

FIGS. 9A and 9B are explanatory views illustrating the configuration of a notch filter according to a third modification. The notch filter of the third modification has a similar basic configuration to that of the notch filter 10 of the embodiment shown in FIGS. 1A and 1B. The third modification has the following differences from the embodiment. In the notch filter 10 of the embodiment, as shown in FIG. 9B, the wide path portion 21 having the width identical with the width W1, the tapered portion 22 having the gradually decreasing width, and the narrow path portion 23 having the width narrower than the width W1 are formed from the inlet side thereof. In the notch filter of the third modification as shown in FIG. 9B, on the other hand, a middle path portion 22*a* having a medium width between the widths of the wide path portion and the narrow path portion is formed, in place of the tapered portion 22. There is a step s1 at a boundary between the wide path portion 21 and the middle path portion 22*a*, and there is a step s2 at a boundary between the middle path portion 22*a* and the narrow path portion 23. The length of the middle path portion 22*a* is equal to the length of the tapered portion 22.

In the third modification, the middle path portion 22*a* has a fixed width. According to a further modification, the width of the middle path portion 22*a* may be decreased from the wide path portion 21 toward the narrow path portion 23. The characteristic of the third modification is discontinuous connections of the middle path portion 22*a* with the wide path portion 21 and with the narrow path portion 23, like the steps s1 and s2, irrespective of the shape of the middle path portion 22*a*. According to another modification, the middle path portion 22*a* may be omitted from the configuration of the third modification, and the wide path portion 21 and the narrow path portion 23 may be directly connected with each other by one single step. On the contrary, the wide path portion 21 and the narrow path portion 23 may be connected with each other in a stepwise manner including a larger number of steps than that of the third modification.

Figure 10:
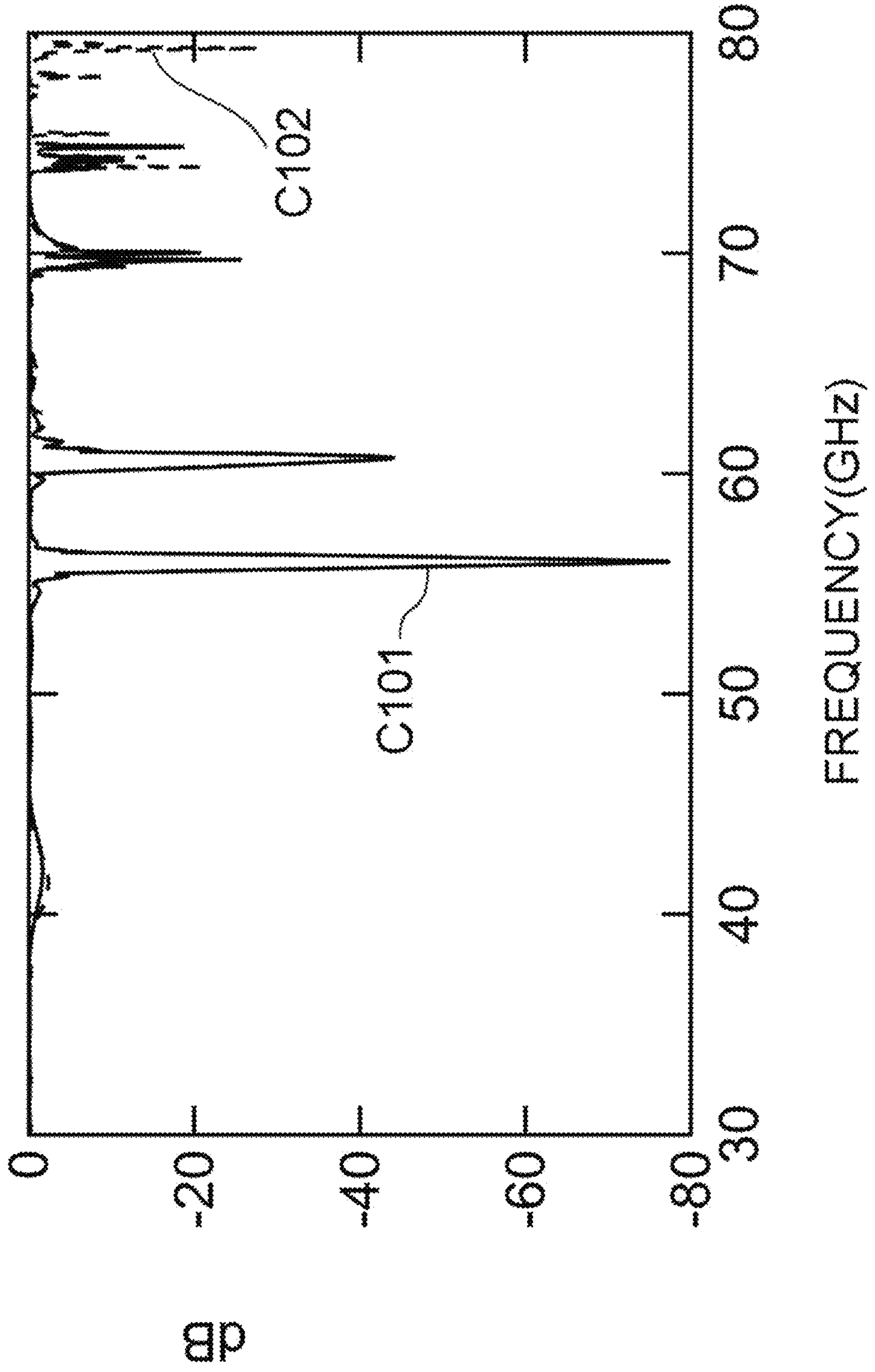
FIG. 10 is an explanatory chart showing the effects of the notch filter according to the third modification.

FIG. 10 is an explanatory view illustrating the effects of the notch filter according to the third modification. This shows the results of a simulation of attenuation at respective frequencies when the electromagnetic wave in the Q band is made to pass through the waveguide. A graph C101 shown by the solid line shows the result with regard to the notch filter of the embodiment, and a graph C102 shown by the broken line shows the result with regard to the notch filter of the third modification. As illustrated, providing the steps hardly affects the attenuation effects of the notch filter.

Figure 11:
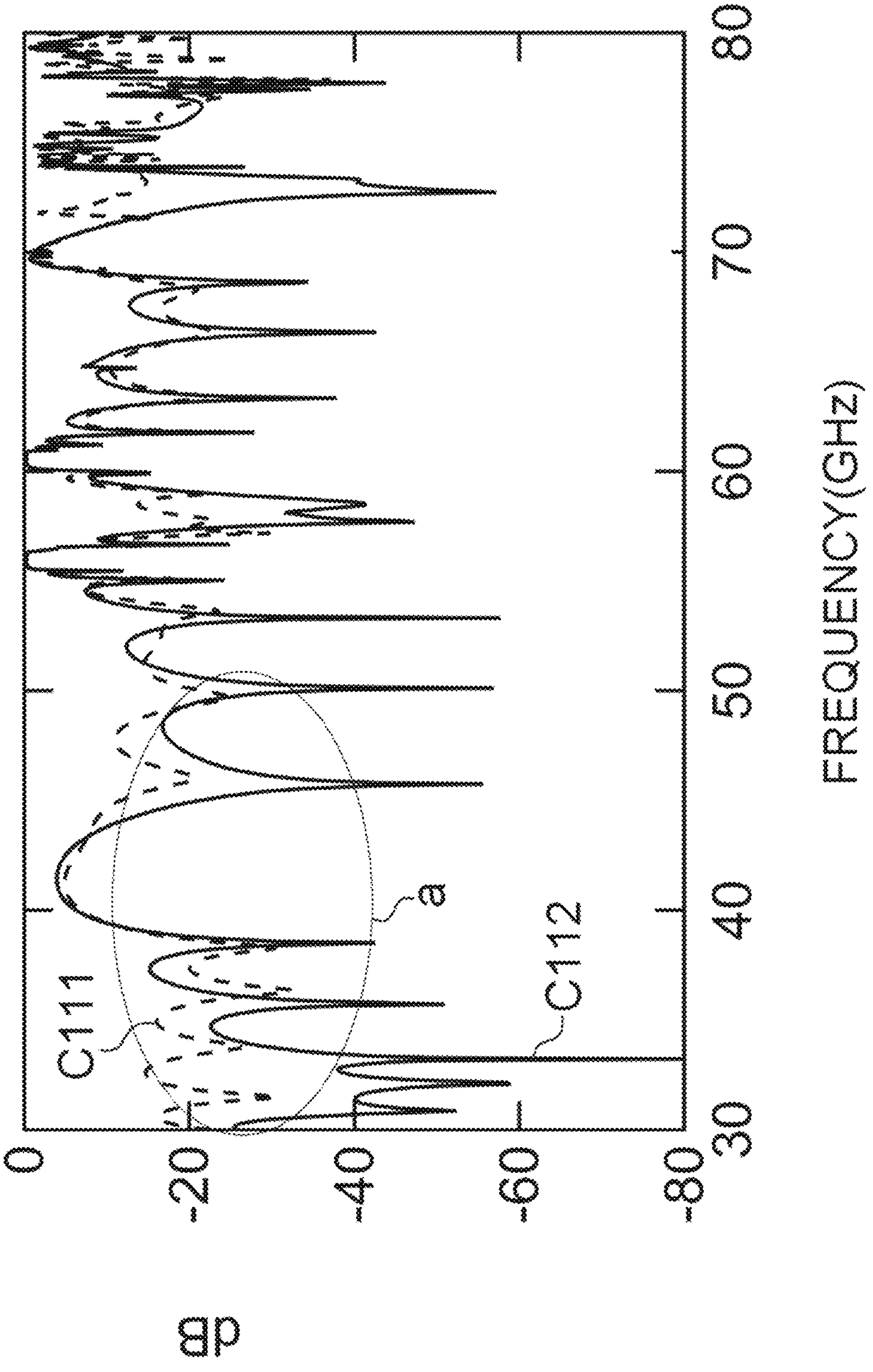
FIG. 11 is an explanatory chart showing the reflection characteristics of the notch filter according to the third modification.

FIG. 11 is an explanatory view showing the reflection characteristics of the notch filter according to the third modification. This shows the results of a simulation of the intensity of the electromagnetic wave reflected from some location of the waveguide when the electromagnetic wave in the Q band is made to pass through the waveguide. A graph C111 shown by the broken line shows the result with regard to the notch filter of the embodiment, and a graph C112 shown by the solid line shows the result with regard to the notch filter of the third modification. As shown in an area a, in a range of 30 to 50 GHz, the graph C112 has lower values, which suggest the weaker reflection of the electromagnetic wave, compared with those of the graph C111. This shows that the notch filter of the third modification has the improved reflection characteristics, compared with the notch filter of the embodiment. The configuration of providing the steps at the connecting locations of the wide path portion and the narrow portion as described above improves the reflection characteristics.

D4. Fourth Modification

The following describes a fourth modification. A notch filter of the fourth modification has a similar basic configuration to that of the notch filter 10 of the embodiment shown in FIGS. 1A and 1B but has a different shape of the tapered portion 22.

Figure 12A:
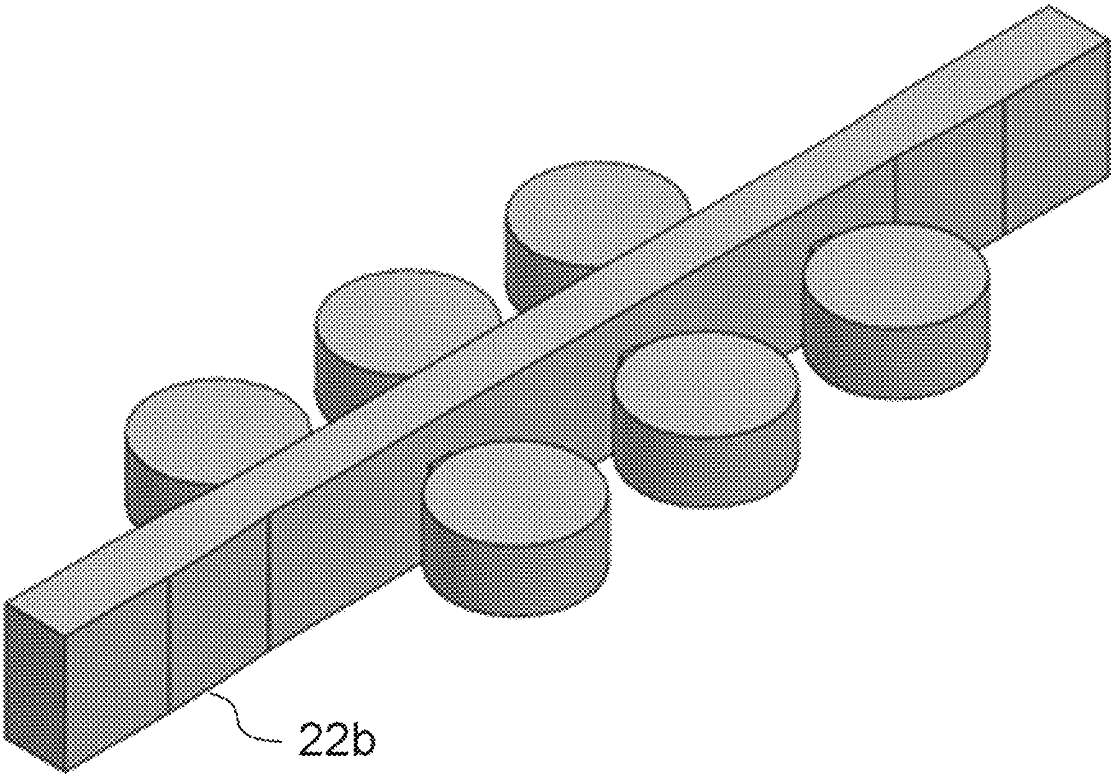
FIGS. 12A and 12B are a perspective view and a partial plan view, respectively, illustrating the configuration of a notch filter according to a fourth modification.
Figure 12B:
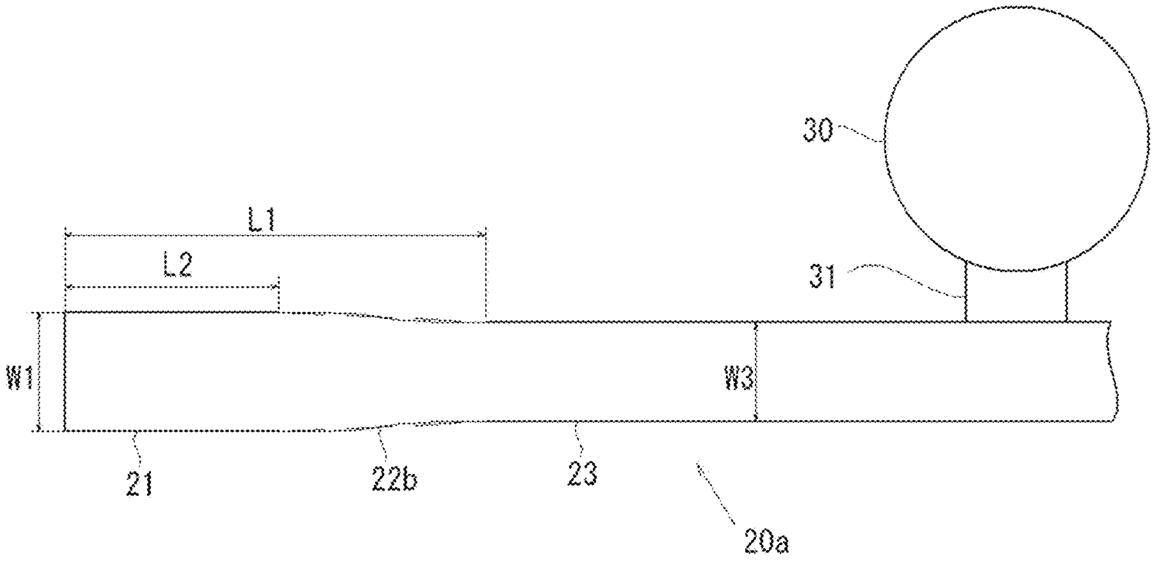

FIGS. 12A and 12B are explanatory views illustrating the configuration of the notch filter according to the fourth modification. In the notch filter 10 of the embodiment, the tapered portion 22 is configured to linearly connect the wide path portion 21 with the narrow path portion 23. In the notch filter of the fourth modification, on the other hand, a connecting portion 22*b* configured to connect the wide path portion with the narrow path portion in a curved shape is formed instated of the tapered portion 22. In the fourth modification, the connecting portion 22*b* is formed as an S-shaped curve to be brought into contact with the wide path portion and the narrow path portion. The connecting portion 22*b* may, however, be formed as an outward convex curve or an inward convex curve.

Figure 13:
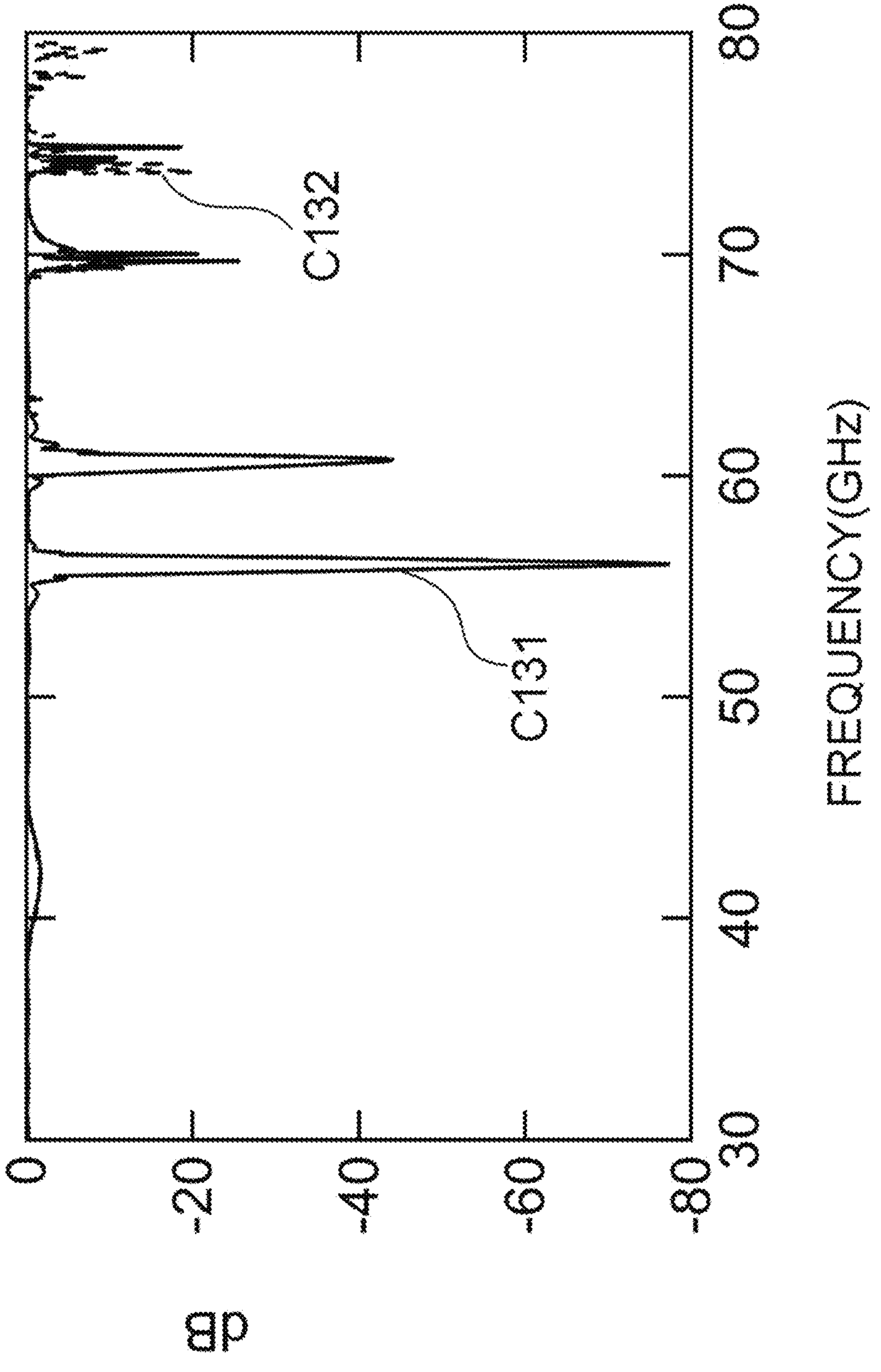
FIG. 13 is an explanatory chart showing the effects of the notch filter according to the fourth modification.

FIG. 13 is an explanatory view showing the effects of the notch filter according to the fourth modification. This shows the results of a simulation of attenuation at respective frequencies when the electromagnetic wave in the Q band is made to pass through the waveguide. A graph C131 shown by the solid line shows the result with regard to the notch filter of the embodiment, and a graph C132 shown by the broken line shows the result with regard to the notch filter of the fourth modification. As illustrated, providing the steps hardly affects the attenuation effects of the notch filter.

D5. Fifth Modification

The following describes a fifth modification. A notch filter of the fifth modification has a similar basic configuration to that of the notch filter 10 of the embodiment shown in FIGS. 1A and 1B but has a different length of the tapered portion 22.

Figure 14A:
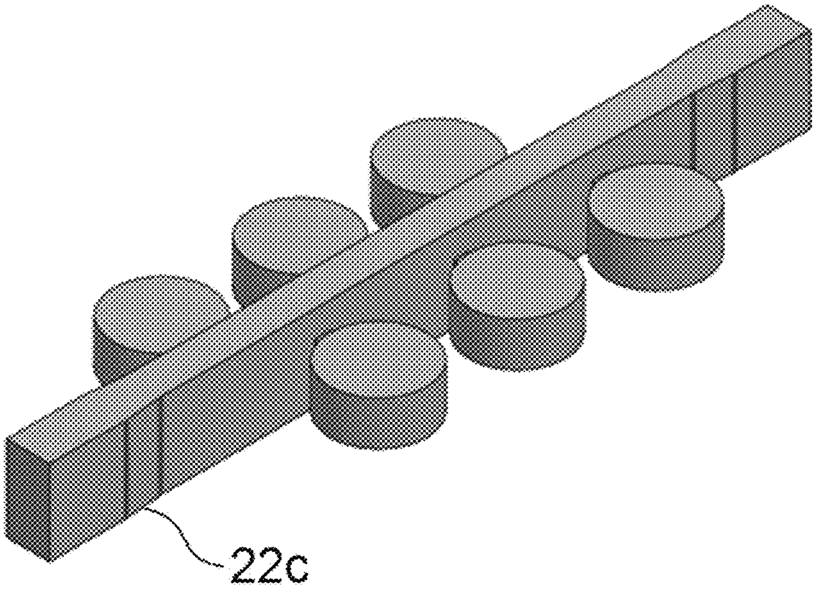
FIGS. 14A and 14B are a perspective view and a partial plan view, respectively, illustrating the configurations of a notch filter according to a fifth modification.
Figure 14B:
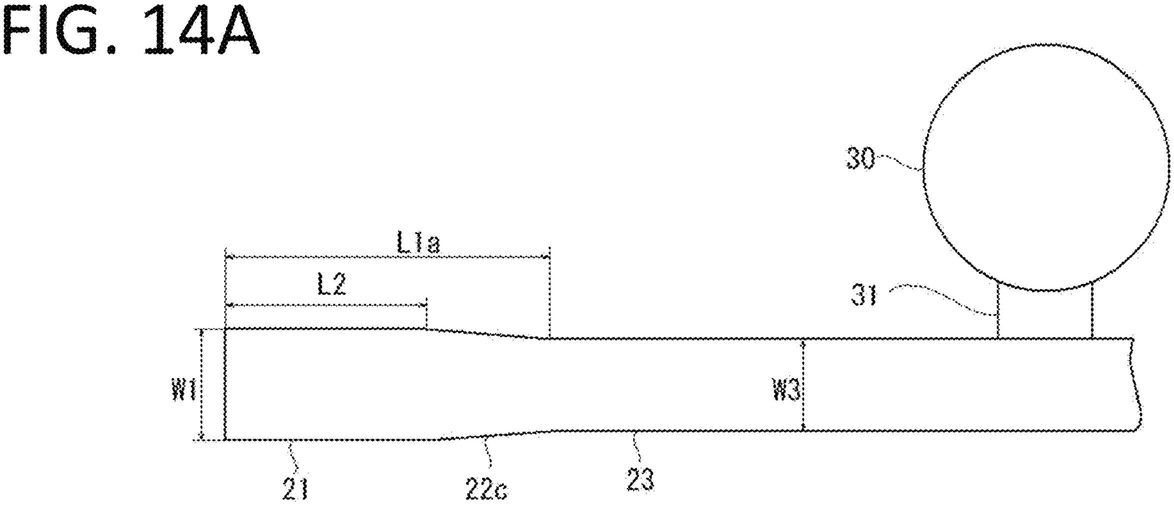
Figure 14C:
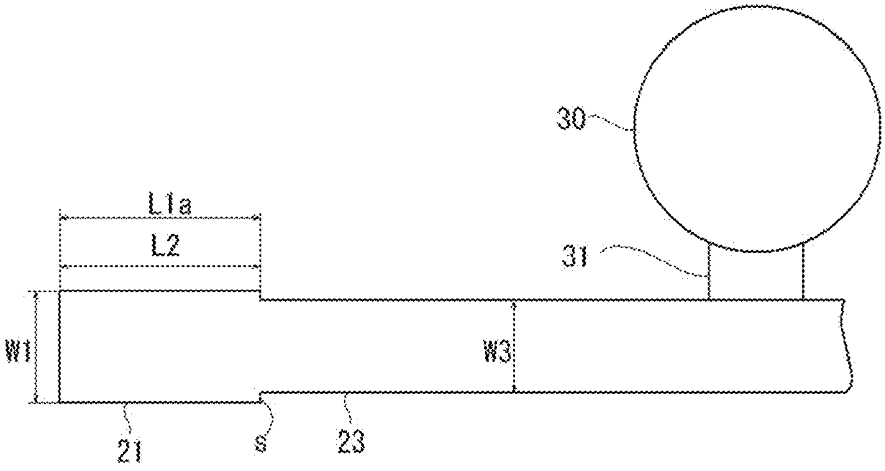
FIG. 14C is a partial plan view of another example in the fifth modification.

FIGS. 14A through 14C are explanatory views illustrating the configurations of the notch filter according to the fifth modification. As shown in FIG. 14A, the notch filter of the fifth modification has a tapered portion 22*c* that is shorter than the tapered portion 22 included in the notch filter 10 of the embodiment. The tapered portion 22*c* is shortened, while the length of the wide path portion 21 is not changed. The boundary between the narrow path portion and the tapered portion is positioned at the distance L1 from the opening in the embodiment but is positioned at a shorter distance L1*a* in the fifth modification. For the purpose of illustration, the configuration shown in FIG. 14A and FIG. 14B is called a configuration 1 of the fifth modification.

The length of the tapered portion 22*c* may be set arbitrarily. In the case where the length of the tapered portion 22*c* is set to 0, this is equivalent to a state without the tapered portion 22*c* as shown in FIG. 14C. In this case, the wide path portion 21 and the narrow path portion 23 are directly connected with each other, with formation of a step s. This configuration is called a configuration 2 of the fifth modification.

Figure 15:
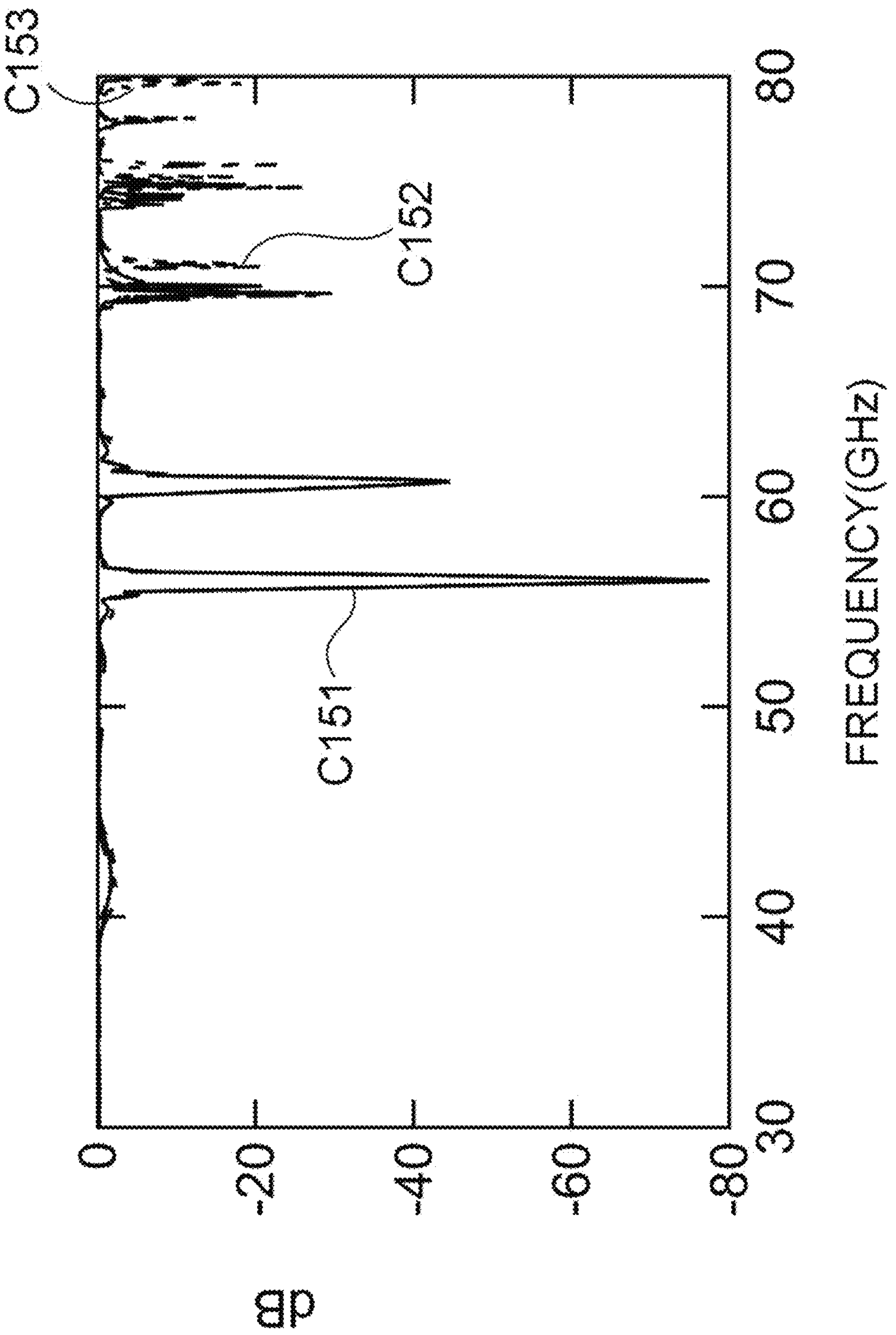
FIG. 15 is an explanatory chart showing the effects of the notch filter according to the fifth modification.

FIG. 15 is an explanatory chart showing the effects of the notch filter according to the fifth modification. This shows the results of a simulation of attenuation at respective frequencies when the electromagnetic wave in the Q band is made to pass through the waveguide. A graph C151 shown by the solid line shows the result with regard to the notch filter of the embodiment, a graph C152 shown by the broken line shows the result with regard to the configuration 1 of the fifth modification, and a graph C153 shown by the one-dot chain line shows the result with regard to the configuration 2 of the fifth modification. As illustrated, any of these configurations hardly affects the attenuation effects of the notch filter.

In addition to the above modification, the tapering configuration may be changed on an inlet side and on an outlet side. For example, a tapered portion may be provided on the inlet side, whereas a step may be provided on the outlet side, and vice versa. As described above, a variety of modifications may be employed to connect the wide path portion with the narrow path portion.

D6. Sixth Modification

The following describes a sixth modification. A notch filter of the sixth modification has a waveguide of a similar basic configuration to that of the waveguide of the notch filter 10 of the embodiment shown in FIGS. 1A and 1B but has a different number of circular cavities and different heights (called cavity lengths) of the circular cavities.

Figure 16:
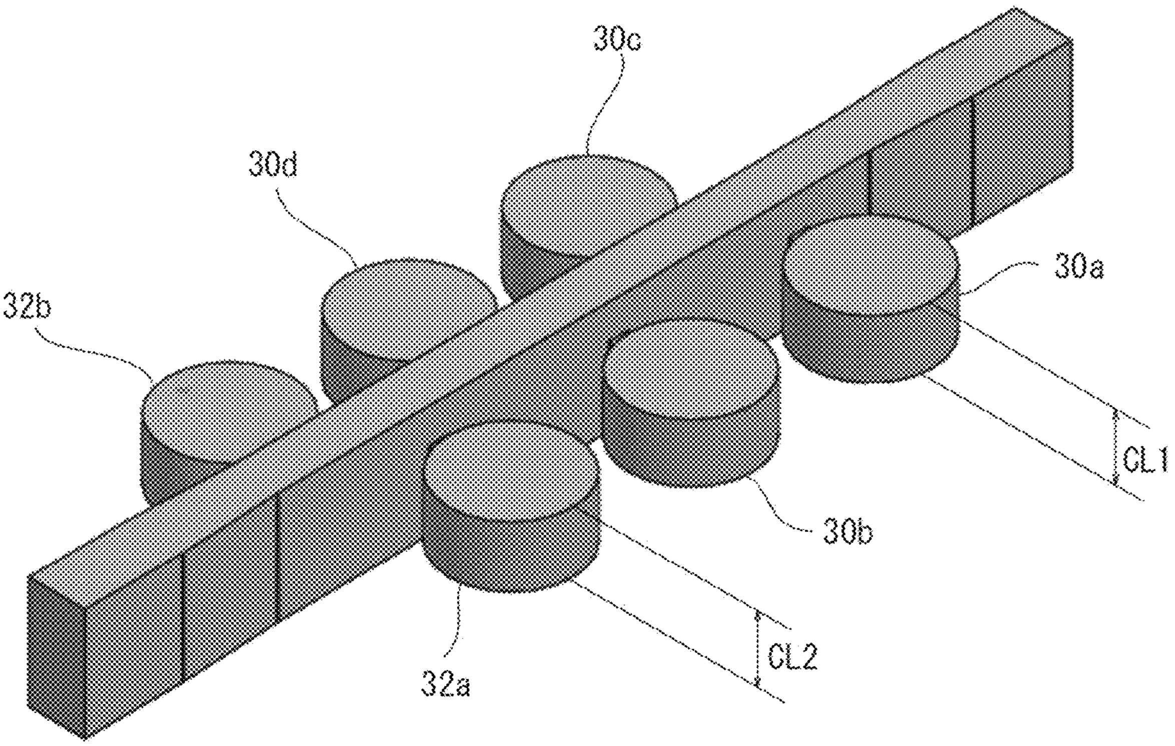
FIG. 16 is a perspective view illustrating the configuration of a notch filter according to a sixth modification.

FIG. 16 is an explanatory view illustrating the configuration of the notch filter according to the sixth modification. While the notch filter of the embodiment is provided with the two circular cavities 30 and 32, the notch filter of the sixth modification is provided with a total of six circular cavities 30*a* to 30*d*, 32*a* and 32*b* on the left side and on the right side as shown in FIG. 16. In the embodiment, the circular cavities 30 and 32 have an identical cavity length. In this modification, on the other hand, the circular cavities 30*a* to 30*d* have a cavity length identical with the cavity length of the embodiment, while the circular cavities 32*a* and 32*b* have a longer cavity length than the cavity length of the embodiment by approximately 5%.

Figure 17:
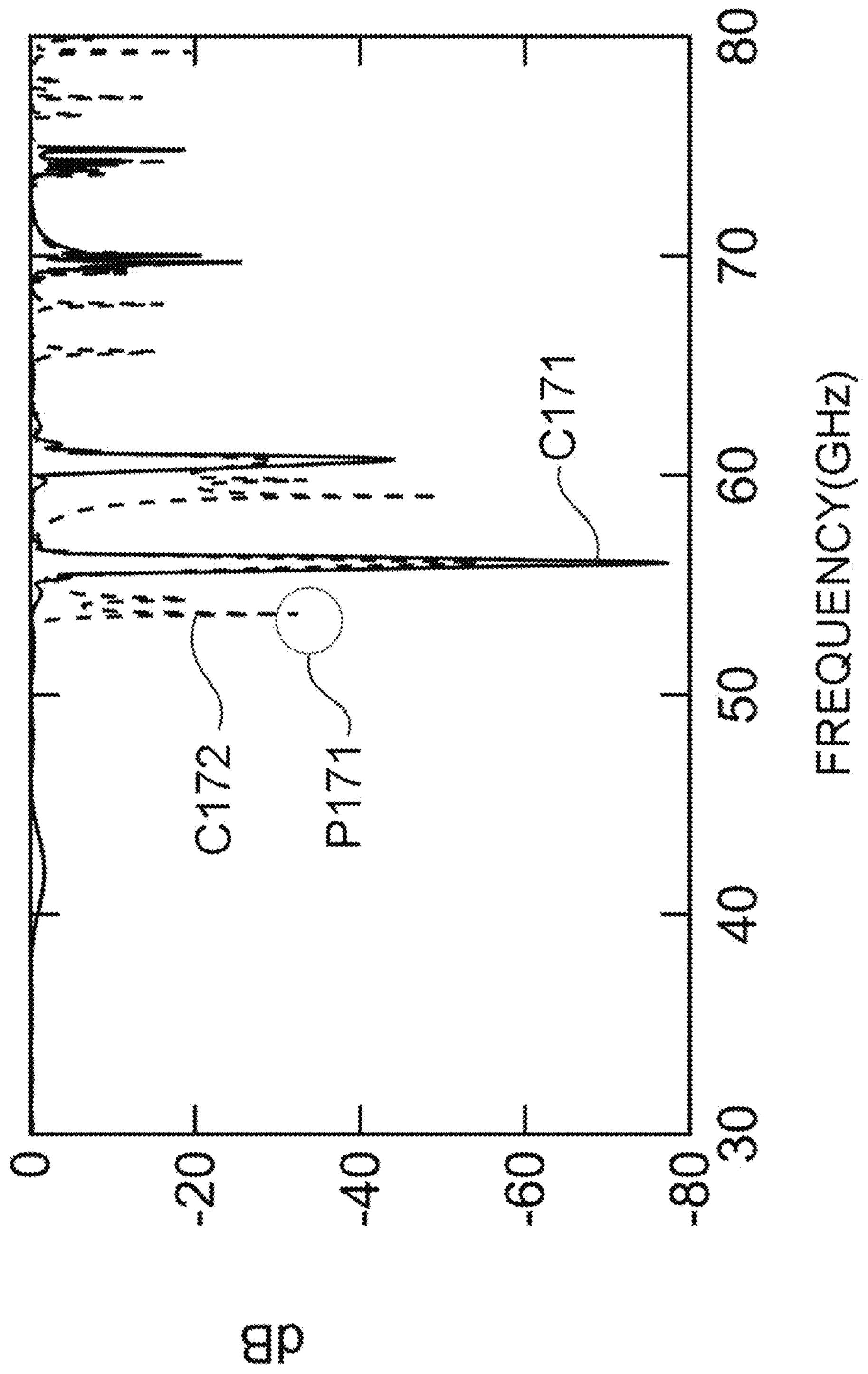
FIG. 17 is an explanatory chart showing the effects of the notch filter according to the sixth modification.

FIG. 17 is an explanatory chart showing the effects of the notch filter according to the sixth modification. This shows the results of a simulation of attenuation at respective frequencies when the electromagnetic wave in the Q band is made to pass through the waveguide. A graph C171 shown by the solid line shows the result with regard to the notch filter of the embodiment, and a graph C172 shown by the broken line shows the result with regard to the sixth modification. In the sixth modification, a significant attenuation effect is observed at a frequency other than the notch frequency, as shown by a peak P171. The configuration of providing a plurality of cavities having different cavity lengths allows for attenuation at a plurality of frequencies as notch frequencies.

In the sixth modification, the number of the circular cavities and the lengths of the respective circular cavities may be determined arbitrarily. The sixth modification provides the circular cavities having two different cavity lengths. A further modification may provide circular cavities having three or more different cavity lengths.

The circular cavities 32*a* and 32*b* having the longer cavity length are arranged on the inlet side in the sixth modification, but their arrangement may be determined arbitrarily.

D7. Seventh Modification

The following describes a seventh modification. A notch filter of the seventh modification has a waveguide of a similar basic configuration to that of the waveguide of the notch filter 10 of the embodiment shown in FIGS. 1A and 1B but has a different number of circular cavities and a different arrangement of the circular cavities.

Figure 18:
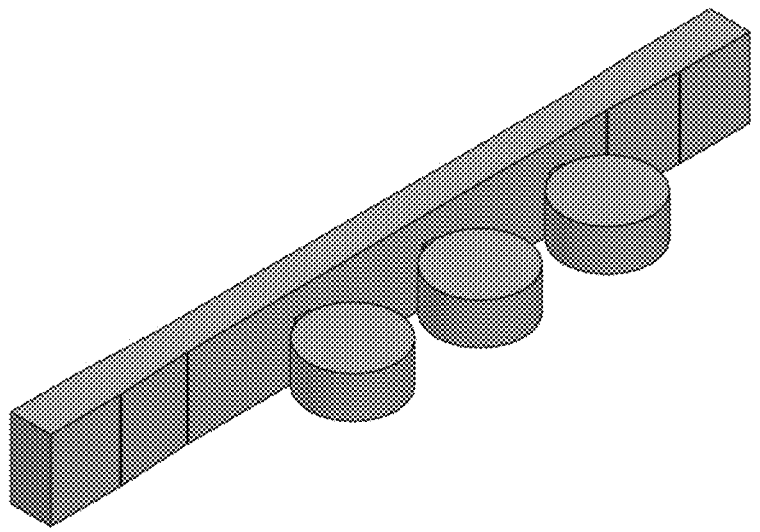
FIG. 18 is a perspective view illustrating the configuration of a notch filter according to a seventh modification.

FIG. 18 is an explanatory view illustrating the configuration of the notch filter according to the seventh modification. While the notch filter of the embodiment is provided with the two circular cavities 30 and 32 respectively arranged on the left side and on the right side of the waveguide, the notch filter of the seventh modification is provided with three circular cavities all arranged on one side of the waveguide. The respective circular cavities have the dimensions identical with those of the embodiment. The number, the arrangement and the dimensions of the circular cavities are not limited to the example shown in FIG. 18 but may be set arbitrarily.

Figure 19:
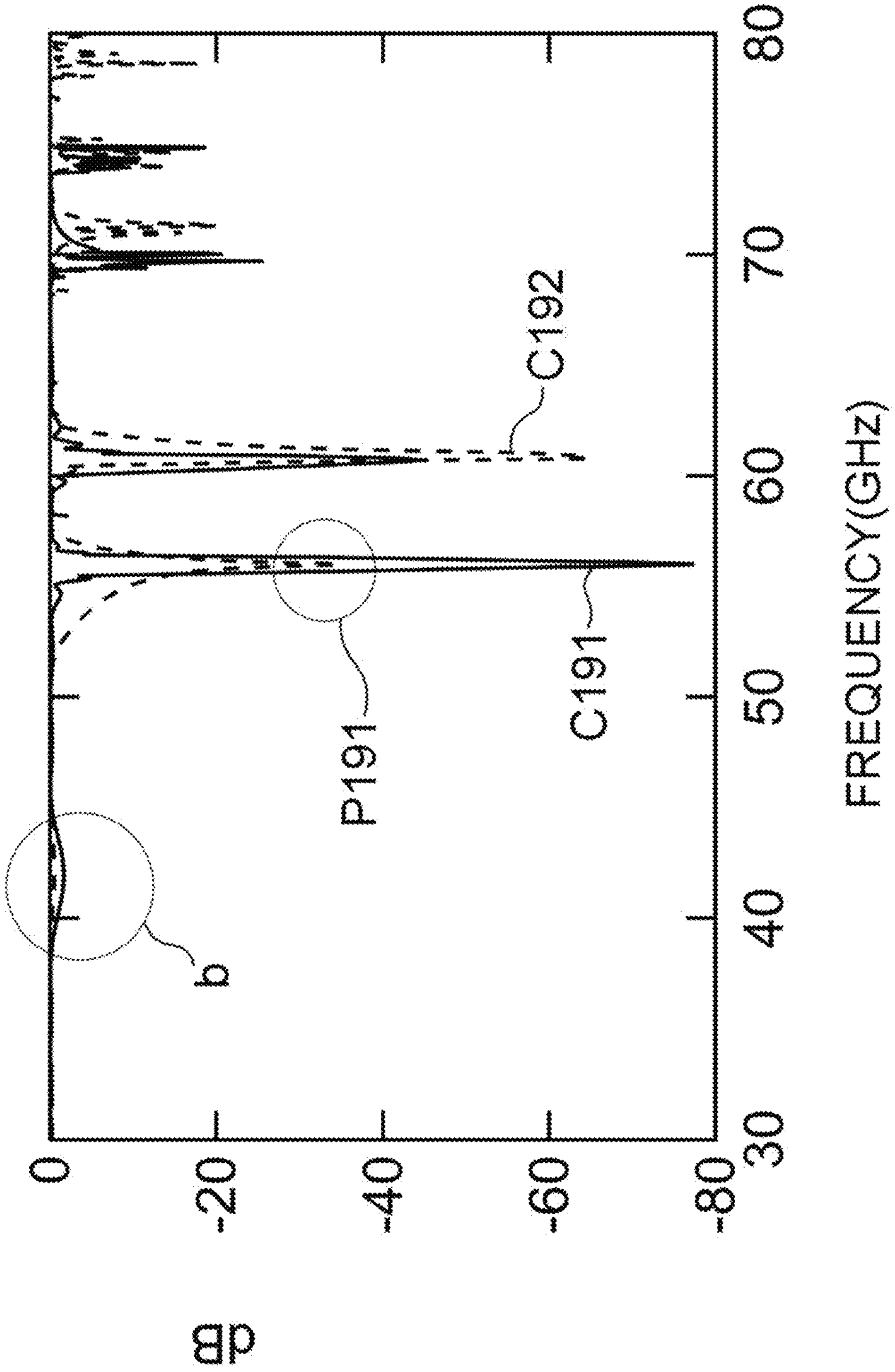
FIG. 19 is an explanatory chart showing the effects of the notch filter according to the seventh modification.

FIG. 19 is an explanatory chart showing the effects of the notch filter according to the seventh modification. This shows the results of a simulation of attenuation at respective frequencies when the electromagnetic wave in the Q band is made to pass through the waveguide. A graph C191 shown by the solid line shows the result with regard to the notch filter of the embodiment, and a graph C192 shown by the broken line shows the result with regard to the seventh modification. In the notch filter of the seventh modification, the attenuation effect at the notch frequency is slightly reduced as shown by a peak P191. As shown by an area b, however, in a frequency band of about 40 GHz, the seventh modification has lower attenuation of the electromagnetic wave, i.e., a smaller loss, compared with the embodiment.

As described above, the loss at a predetermined frequency lower than the notch frequency may be reduced according to the number and the arrangement of the circular cavities.

The foregoing describes a variety of the embodiment and the modifications of the present disclosure. The present disclosure may be implemented by the configurations of a variety of other modifications without departing from the scope of the present disclosure.

The present disclosure is applicable to the notch filter provided with the waveguide and the cavities.

What is claimed is:

1. A notch filter for removing an electromagnetic wave of a specific frequency, the notch filter comprising:

a rectangular waveguide having a rectangular cross-section and configured to allow a predetermined frequency band to pass therethrough, the rectangular cross-section having long sides each forming an E plane and short sides; and at least one cavity formed in dimensions according to the specific frequency and provided along an axis direction of the rectangular waveguide, the at least one cavity being in a cylindrical shape and protruding in a direction perpendicular to the E plane, wherein the long sides and the short sides of the rectangular cross-section at an opening of the rectangular waveguide have respective lengths in accordance with the predetermined frequency band, wherein the rectangular waveguide includes:

a narrow path portion at which the short sides of the rectangular cross-section have a length smaller than that of the short sides of the rectangular cross-section at the opening of the rectangular waveguide, the at least one cavity being provided to the narrow path portion, and wherein the length of the short sides of the rectangular cross-section in the narrow path portion is set such that the electromagnetic wave of the specific frequency propagates in a predetermined mode.

2. The notch filter according to claim 1, wherein the long sides of the rectangular cross-section in the narrow path portion have a length smaller than that of the long sides of the rectangular cross-section at the opening of the rectangular waveguide.

3. The notch filter according to claim 1, comprising:

a plurality of cavities in respective cylindrical shapes of different heights, the plurality of cavities being arranged such that respective axes of the cylindrical shapes are parallel to the long sides of the rectangular cross-section.

4. The notch filter according to claim 1, wherein the at least one cavity is provided on each of the opposing E planes of the rectangular waveguide.

5. The notch filter according to claim 1, wherein the rectangular waveguide further includes:

a wide path portion which has dimensions identical to that of the opening of the waveguide, the narrow path portion and the wide path portion being coupled by a tapered connection.

6. The notch filter according to claim 1, wherein the rectangular waveguide further includes:

a wide path portion which has dimensions identical to that of the opening of the waveguide, the narrow path portion and the wide path portion being coupled by a stepwise connection.

7. The notch filter according to claim 1, wherein the at least one cavity has a circular shape in plan view from a direction parallel to the long sides.

8. The notch filter according to claim 1, wherein the cylindrical shape has an axis parallel to the long sides.

9. The notch filter according to claim 1, wherein the cylindrical shape has an axis parallel to the short sides.

* * * * *